United States Patent
Clough

(10) Patent No.: US 6,551,657 B1
(45) Date of Patent: *Apr. 22, 2003

(54) PROCESS FOR PRODUCING THIN FILM METAL OXIDE COATED SUBSTRATES

(75) Inventor: Thomas J. Clough, Grover Beach, CA (US)

(73) Assignee: Ensci Inc., Pismo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/861,233

(22) Filed: May 18, 2001

(51) Int. Cl.$^7$ .................................................. B05D 7/00
(52) U.S. Cl. ..................... 427/217; 427/212; 427/216; 427/436; 428/403
(58) Field of Search ................................ 427/212, 213, 427/213.3, 215, 216, 217, 287, 430.1, 436, 569, 576; 428/288, 224, 307.3, 307.7, 402, 403, 404, 406, 33, 337, 414, 425.9, 480, 483, 516, 520, 688

(56) References Cited

U.S. PATENT DOCUMENTS

| | | |
|---|---|---|
| 3,650,694 A * | 3/1972 | Allen .......................... 423/613 |
| 5,032,568 A | 7/1991 | Lau et al. |
| 5,236,737 A | 8/1993 | Linton |
| 5,326,633 A | 7/1994 | Clough et al. |
| 5,603,983 A * | 2/1997 | Clough et al. ........... 427/126.3 |
| 5,609,921 A | 3/1997 | Gitzhofer et al. |
| 5,633,081 A | 5/1997 | Clough et al. |
| 5,718,970 A | 2/1998 | Longo |
| 5,756,207 A | 5/1998 | Clough et al. |

* cited by examiner

Primary Examiner—Shrive P. Beck
Assistant Examiner—Rebecca A. Blanton
(74) Attorney, Agent, or Firm—Frank J. Uxa

(57) ABSTRACT

Processes for coating three dimensional inorganic substrates, with shielded surfaces, with metal oxide-containing coatings are disclosed. Such processes comprise contacting a substrate with a liquid soluble metal oxide precursor formed reactant mixture at fast reaction and elevated temperature reaction conditions to form a substrate containing metal oxide on at least a portion of the three dimensions and shielded surfaces of the substrate. Also disclosed are substrates coated with metal oxide-containing coatings for use in various applications including catalysis, shielding, electrostatic dissipation and battery applications.

33 Claims, No Drawings

PROCESS FOR PRODUCING THIN FILM METAL OXIDE COATED SUBSTRATES

BACKGROUND OF THE INVENTION

The present invention relates to a process for coating particle substrates, the coated particle substrate and to applications and uses thereof. More particularly, the invention relates to coating particle substrates with a metal oxide-containing material, such material preferably being an electrically conductive and/or ferromagnetic oxide-containing material and such coated substrate.

In many electronic and/or ferromagnetic applications it would be advantageous to have an electrically, electronically conductive; electro mechanical and/or ferromagnetic metal oxide coating which is substantially uniform, has high and/or designed electronic conductivity, and/or ferro magnetic properties and has good chemical properties, e.g., morphology, stability, etc.

A number of techniques have been employed to provide certain metal oxide coatings on substrates. The CVD process is well known in the art for coating a single flat surface, which is maintained in a fixed position during the contacting step. The conventional CVD process is an example of a "line-of-sight" process or a "two dimensional" process in which the metal oxide is formed only on that portion of the substrate directly in the path of the metal source as metal oxide is formed on the substrate. Portions of the substrate, particularly internal surfaces, which are shielded from the metal oxide being formed, e.g., such as the opposite side and edges of the substrate, pores or channels which extend inwardly from the external surface and substrate layers which are internal or at least partially shielded from the depositing metal oxide source by one or more other layers or surfaces closer to the external substrate surface being coated, do not get uniformly coated, if at all, in a "line-of-sight" process. Such shielded substrate portions either are not being contacted by the metal source during line-of-sight processing or are being contacted, if at all, not uniformly by the metal source during line-of-sight processing. A particular problem with "line-of-sight" processes is the need to maintain a fixed distance between the source and the substrate. Otherwise, metal oxide can be deposited or formed off the substrate and lost, with a corresponding loss in process and reagent efficiency.

In an attempt to overcome the limitations of the "line-of-sight" processes it has been proposed to contact a three dimensional substrate with a metal oxide precursor wherein the precursor preferably forms a liquidous metal oxide precursor on the substrate. The formed coated substrate is subjected to oxidation conditions to convert the metal oxide precursor to the metal oxide coated substrate (U.S. Pat. Nos. 5,326,633 [1994], U.S. Pat. No. 5,603,983 [1997], U.S. Pat. No. 5,633,081 [1997] and U.S. Pat. No. 5,756,207 [1998] granted to Clough et al.) While these processes represent a significant advance over the prior art CVD "line-of-sight" processes described above, the Clough et al. processes typically require total times for contacting, equilibration and oxidation in the range of minutes to hours.

It has been desirable to further improve the processes for producing metal oxide coated substrate particles particularly under fast reaction processing conditions which significantly reduce the processing times required for producing metal oxide coated particle substrates and to produce unique metal oxide coated substrates having improved properties

BRIEF SUMMARY OF THE INVENTION

A new process, e.g., a "non-line-of-sight" or "three dimensional" process, useful for coating of three dimensional particle substrates has been discovered. As used herein, a "non-line-of-sight" or "three dimensional" process is a process which coats surfaces of a substrate with a metal oxide coating which surfaces would not be directly exposed to metal oxide-forming compounds being deposited on the external surface of the substrate during the first line-of-sight contacting step. In other words, a "three dimensional" process coats coatable substrate surfaces which are at least partially shielded by other portions of the substrate which are closer to the external surface of the substrate and/or which are further from the metal oxide forming source during processing, e.g., the internal and/or opposite side surfaces of for example glass, ceramic or mineral particle substrates such as fibers, spheres, flakes or other shapes or surfaces including porous shapes.

A new fast reaction, elevated temperature process for at least partially coating a three dimensional substrate having shielded surfaces with a metal oxide, preferably an electrically conductive or ferromagnetic metal oxide coating on at least a part of all three dimensions thereof and on at least a part of said shielded surfaces thereof has been discovered. In brief, the process comprises contacting the substrate particles with a metal oxide precursor, for example, stannous chloride, stannic chloride, stannous oxide, zinc chloride, cuprous chloride, ferric chloride or titanium tetrachloride in a liquid form and/or in a solid form, to form a metal oxide precursor/substrate reactant mixture; preferably contacting the substrate also with at least one interacting component, i.e., a conductivity interactive or a ferromagnetic interacting component and contacting the reactant mixture with an oxidizing agent under fast reaction short residence time, higher temperature condition to form a metal oxide coated substrate and recovering such coated substrate, preferably a semi conductor or ferromagnetic oxide-containing coated substrate more preferably an n-type oxide semi conductor, more particularly a doped semi-conductor and/or semi conductor having a defect and/or non-stoichiometric structure which enhances conductivity. The contacting of the substrate with the metal oxide precursor and optionally with the interacting component to form the reactant mixture takes place prior to substantially deleterious oxidation of the metal oxide precursor. In a particularly preferred embodiment, the reaction mixture is introduced directly into a high temperature oxidizing reaction zone under fast reaction processing conditions. The coated substrate is then recovered by conventional means.

The process can provide unique coated substrates including single and mixed oxides which have application designed electrical conductivity or magnetic properties and/or pearlescent or transparent properties so as to be suitable for use as components such as additives in a wide variety of applications. Substantial coating uniformity, e.g., in the thickness of the metal oxide coating and in the distribution of interacting component in the coating, is obtained. Further, the present metal oxide coated substrates in general have outstanding stability, e.g., in terms of electrical or magnetic properties and morphology and are thus useful in various applications.

DETAILED DESCRIPTION OF THE INVENTION

The present coating process comprises forming a reactant mixture by contacting a substrate with a metal oxide precursor, such as metal chloride forming components, metal complexes and mixtures thereof and contacting the reactant mixture with an oxidizing agent, at fast reaction, elevated temperature process conditions, preferably oxidizing and hydrolyzing conditions, effective to form a metal oxide containing coating on the substrate. The reactant mixture preferably comprises at least one conductivity or magnetic interacting component, hereinafter referred to as interacting or interactant component, such as at least one dopant compound, in an effective amount to form an interacting component-containing coating, such as a dopant component-containing coating, on at least a portion of the substrate. The reactant mixture, preferably with an interacting component, for example a dopant component, are contacted with at least one oxidizing agent at conditions effective to convert the metal oxide precursor to metal oxide and form a metal oxide-containing coating, preferably a semi conductor, or magnetic metal oxide-containing coating, on at least a portion of the substrate. The process as set forth below will be described in many instances with reference to various compounds of stannous chloride, stannic chloride, zinc chloride, stannous oxide, cuprous chloride, titanium chloride, and ferric chloride which have been found to provide particularly outstanding process and product properties. However, it is to be understood that other suitable oxide precursors are included within the scope of the present invention.

As set forth above the reactant mixture is subjected to oxidizing fast reaction processing conditions at elevated temperatures in order to form a metal oxide coating on the substrate. The reactant mixture should be formed prior to deleterious oxidation of the metal oxide precursor i.e. non-deleterious oxidation. This could result in oxidation of the metal oxide precursor off of the substrate thereby decreasing the yield of metal oxide coated substrate. By "non-deleterious oxidation" is meant that the metal oxide precursor, for example stannous chloride, zinc chloride, cuprous chloride and ferric chloride is associated with the substrate before deleterious oxidation of the metal oxide precursor takes place off the substrate, such as not to be associated with the substrate coatings. It has been found that the preferred reactant mixtures are those that are formed prior to the introduction of the reactant mixture into the high temperature fast reaction zone. Thus for example, the reactant mixture can be a liquid slurry wherein the metal oxide precursor is soluble in the liquid optionally with the interactant being soluble and/or solid in the liquid slurry. Further, the liquid slurry can be a suspension of the metal oxide precursor with the substrate preferably as a precipitate on the substrate in the liquid solid slurry. Further the reactant mixture can be a solid or powder such as a metal oxide precursor coated substrate. Each of the above reactant mixtures can offer unique and distinct processing product advantages in the process of this invention. The liquid part of the reactant mixtures is preferably atomized, such as gas atomized, upon introduction with the substrate into the reaction zone for oxidation to the metal oxide substrates. Further, the solid reactant mixtures such as powder mixtures, can be air fluidized into the reaction zone or gravity or mechanically fed into the reaction zone. For the liquid reactant mixtures, it is preferred to maximize the concentration of the substrate in the liquid slurries on a wt % basis so as to maximize the association of the metal oxide precursor and optionally interacting component with the substrate. It is preferred that the concentration of substrate in liquid slurries be from about 10 to 60 wt % more preferably from about 30 to 50 wt % or higher. As is recognized by those of skill in the art, the viscosity of the slurries will vary as a function of both the particle size, its geometry and density. Viscosities are used which allow for overall optimum process efficiencies on a product quality and throughput basis.

The fast reaction processing conditions as set forth above include a very short oxidation reaction residence time for the particle in the elevated temperature reaction zone. "Reaction zone" is defined as that zone at elevated temperature wherein fast oxidation of the metal oxide precursor takes place on the substrate such that the metal oxide precursor is not substantially lost as separate metal oxide particles not associated with the substrate. Thus the reaction zone allows for association of the metal oxide precursor on the substrate wherein subsequent processing will not substantially adversely affect the overall metal oxide coating on the substrate. It is important that the residence time in the elevated temperature reaction zone associate the metal oxide precursor with the substrate. It is contemplated within the scope of this invention that further processing such as sintering or calcination to promote further oxidation uniform crystalinity and/or coating densification can be carried out according to the process of this invention.

The fast reaction processing conditions in the oxidation reaction zone can vary as to temperature and residence time according to the physical and chemical properties of the metal oxide precursor, interacting component and substrate. The average particle residence time in the oxidizing reaction zone is from about 1 millisecond to about 1 second, more preferably from about 2 milliseconds to 500 milliseconds and still more preferably from about 10 milliseconds to 250 milliseconds. Further, the residence time can be defined by the particle velocity in the reaction oxidizing zone. Preferably the average particle velocity in the reaction zone is from about three to about 30 meters/second, more preferably from about three to about 10 meters/second.

The elevated temperature in the reaction zone is maintained by a thermal source that rapidly transfers thermal energy to the reactant mixture. The unique combination of reactant mixture, short residence time and a thermal source for rapid thermal transfer provides for rapid association of the metal oxide precursor with the substrate on both external and shielded surfaces without substantially adversely affecting the solid integrity of the substrate. By the term solid integrity is meant that the substrate retains at least a part preferably a majority an even more preferably a substantial majority of the substrate as a solid under the temperature conditions in the reaction zone. Depending on the physical and chemical properties of the substrate the surface and near surface of the substrate can melt under the thermal conditions in the reaction zones. The rapid melting and solidification for certain substrates can provide enhanced properties associated with the metal oxide coating such as barrier properties, binding properties and preferential crystalline surface formation by the substrate. The short residence times in the reaction zones allow for rapid chemical reactions and rapid quench when the substrate particles leave the reaction zone.

The thermal source produces elevated temperatures that allow for the reactant mixture to rapidly produce metal oxide coated substrates and allows residence times that provide for the association of the metal oxide precursor with the substrate. Thus the thermal source must allow for control of the elevated temperature to produce metal oxide coated substrates and a residence time which allows the chemical reactions and/or association of the metal oxide precursor with the substrate to take place on the substrate. The preferred thermal sources which allow for control of elevated temperatures and the residence times necessary for chemical reaction and/or association of the metal oxide precursor with the substrate are induction plasma sources preferably RF induction plasma sources and flame combustion sources.

As set forth above, the thermal source provides an elevated temperature that primarily acts on the metal oxide precursors and optionally interactants and added components to the liquid slurry or powders such that the substrate, primarily the internal portions of the substrate are at a lower temperature than the external temperature in the reaction zone. As will be more fully described below, the typical substrate can have a relatively low heat transfer coefficient which when combined with the residence times in the reaction zone allows for such differential between the external temperature and the internal temperature of the substrate. Further the processing conditions can be adjusted to take advantage of this thermal gradient particularly as to selective melt and resolidification and crystallization on the surface and near surface of the substrate. Further, the temperature within the reaction zone is controlled to allow rapid oxidation and/or hydrolysis of the metal oxide precursors and/or interacting component which reactions can increase substantially the association of the coating i.e. reduced tendency towards volatilization, the completion of the overall oxidation reaction to metal oxide coating. As set forth above, one of the major advances is the association of the metal oxide precursor coating through the reaction zone into the quench stage. The recovered metal oxide coated substrates can be further calcined, sintered or annealed for oxidation, densification and crystallization.

RF inductively coupled plasma systems are well known to those of ordinary skill in the art and typically consist of an RF power generator supplying a RF current to an induction coil wound around a plasma confinement tube. The tube confines the plasma discharge. Power levels for plasma systems can vary from about 10 kW up to about 500 kW. Typical frequencies vary from about 0.3 MHz to even as high as 14 MHz. Typical ranges are in the 0.3 to 5 range.

The plasma system typically uses three different gases including a central gas sometimes referred to as a central swirl gas used primarily for formation of the plasma, a sheath gas used primarily to stabilize and center the plasma and a third carrier gas which typically is used to transport a powder feed and/or atomize a liquid or liquid slurry feed. As is recognized by those of ordinary skill in the art, the composition of all three gases can vary and can include gases such as argon, nitrogen, hydrogen and other gases such as oxygen, carbon dioxide, carbon monoxide and water. In addition mixtures of varying gases can be used depending on the characteristics of the plasma that is required for the process. As set forth above, a component of the plasma gases can serve as the oxidizing agent. In other cases, a secondary gas can be injected into the plasma or sheath surrounding the plasma to provide the oxidizing agent. For example, water vapor can be used as a secondary gas to promote the overall oxidation hydrolysis of the metal oxide precursor to metal oxide coating. Further, as set forth above, the presence of water vapor enhances formation of crystalline metal oxide coatings having improved conductivity and/or magnetic properties. The gases used as sheath, central and carrier gases can be different or the same and mixtures of different gases can be used. For example, air can be used for the sheath, central and carrier gas or various other gases, such as argon, can be combined with the sheath or central gas. The gas flow rates for the central, sheath and carrier gases can vary over a wide range with such ranges being adjusted to within the residence time and particle velocities required for the conversion of the metal oxide precursor to coated metal oxide substrate. In general the rate of introduction of the sheath, central and carrier gases will vary with typically the sheath gas being introduced at a rate of from about three to about five times that of the central swirl gas. In addition, the central swirl gas rate will generally be higher than the carrier gas since the carrier gas is used to control the rate at which the reactant mixture is introduced into the reaction zone. The gas compositions and flow rates can be optimized to provide desired process conditions. For example, nitrogen can be introduced into the central gas in order to lower the overall temperature profile within the reaction zone. Typically the other gas rates and/or partial pressure within the given gas composition are lowered in order to control the particle residence time and particle velocities within the reaction zone. Further, the oxygen content in the various gases within the reaction zone can be adjusted to provide near stochiometric quantities of oxygen or slight excess in order to limit the oxygen present in the later portion and tail of the reaction zone. In addition, oxygen enrichment can take place such as the introduction of oxygen, such as air, at the tail of the reaction zone to provide enhanced overall oxidation conditions prior to quench. Typically, the enthalpy of the gas composition is controlled so as to maintain the elevated temperature that promotes rapid oxidation and/or hydrolysis of the metal oxide precursors on the substrate. Thus the enthalpy of components such as hydrogen and organic components added as part of the liquid slurry and powder reaction mixtures are taken into consideration for defining the temperature required in the reaction zone. Further, the gas rates (volume of gas per unit time) will vary depending on the size and design of the process equipment. As set forth above, the residence times are long and the particle velocities slow when compared to typical sonic and supersonic plasma type systems. As is set forth above, an oxidizing agent, preferably oxygen preferably as oxygen in air or decomposition of water vapor, allows for the oxidation reaction of metal oxide precursor to metal oxide coating on the substrate to take place within the reaction zone at elevated temperatures. It has been found that the residence times and/or particle velocities as set forth above together with the control of gas composition and temperature conditions allow for the oxidation reactions to take place on the substrate to produce the metal oxide coated substrates. The control by the thermal source of the temperature in the plasma or adjacent to the plasma, i.e. reaction zone, allows for the oxidation reactions to take place while not substantially adversely effecting the solid integrity of the substrate. Further, the temperature and the dimension of the plasma can be adjusted so as to provide selective melting on the surface or near surface of the substrate to enhance overall bonding and uniformity of the metal oxide coating on the substrate. As set forth above, the temperature, particle residence time and oxidizing agent concentration allow for the oxidation of the metal oxide precursor to metal oxide coating while not adversely effecting the solid integrity of the substrate. Thus, the temperature within the reaction zone can vary according to the above process conditions and typically are in the range of from about 1000° K. to about 4000° K., more preferably up to about 3000° K. As set forth above, the temperature can be moderated by auxiliary gases including inert gases and water vapor.

The reactant mixture can be introduced into the plasma at varying locations within the plasma including the tail, i.e. terminal, portion of the plasma flame. The reactant mixture in addition can be introduced laterally into or adjacent to the plasma flame and/or the tail of the plasma flame or at varying angles to the plasma including perpendicular to the plasma or the plasma tail. In a typical system configuration a probe of appropriate metallurgy such as inconel in the presence of fluorides, is centrally mounted in the plasma confinement tube. Typically a quartz tube is interposed between the probe and the confinement tube. The central gas in injected into the quartz tube and the sheath gas is injected in the annular passage defined between the quartz tube and the plasma confinement tube. Conventional cooling of the system is used. The reactant mixture feed probe can be used to gas atomize the liquid slurry reaction mixtures of this invention and/or gas atomize, such as with air, the powder feeds of this invention. For example, in the liquid slurries, fine droplets of the liquid slurries can be injected typically into the central portion of or adjacent to the plasma discharge. Further, the position of the injection probe within or adjacent to the plasma for powder or liquid slurries can be varied such as to optimize the performance and overall yields of metal oxide coated substrates. As is set forth above, the reaction mixture can be introduced into the tail of the plasma discharge such as laterally or at an angle into the plasma tail. It is preferred that the reactant mixtures from liquid slurries to powders be introduced into the reaction zone with a carrier gas, particularly an oxygen containing carrier gas which enhances the rate of oxidation of the metal oxide precursor to metal oxide coating on the substrate. The powders can be gravity fed and/or continuously fed such as by screw feeders into the plasma. In a preferred embodiment of this invention, the concentration of the substrate in the liquid slurries can be maintained at a relatively high concentration such as from 30 to 50-wt % or higher in order to optimize the interaction between the metal oxide precursor, interacting component and substrate. The concentration can be adjusted in order to maintain a liquid reactant mixture viscosity which enhances atomization of the liquid reactant mixture and overall steady state process and plasma conditions for conversion and yield of metal oxide coated substrate. Further, the reaction zone can be run at varying pressures including reduced pressures through higher pressures above atmospheric. The choice of pressure is generally a function of the characteristics of the metal oxide precursor and interactant. It is preferred to maintain such conditions of pressure which improve the overall conversion and yield of metal oxide coating on the substrate while reducing and/or minimizing the reaction of metal oxide precursor to metal oxide off of the substrate.

The feed rates of the liquid slurries and powders in general are a function of the reaction zone design and size. In general for small scale reaction zone designs a feed rate of from 100 grams to 500 grams per hour can be used, whereas for larger scale a feed rate of from 0.5 Kg to 50 Kg per hour can be used.

The liquid slurries and powder mixtures can contain various substantially nondeleterious materials including oxidizable materials such as solvents, i.e. alcohols for liquid slurries and organic polymeric binders which can increase the elevated temperature or enthalpy in the reaction zone. The thermal contribution of these oxidizable materials is used in order to design the thermal profile in the reaction zone in order to maximize steady state process conditions and conversion and yields of metal oxide coated substrate. Further, the use of such oxidizable materials, particularly, organic materials can be used to adjust the composition of the plasma gases as a function of the gas composition from gas entry to exit from the reaction zone. For example, the oxygen requirement for oxidation of the metal oxide precursor to metal oxide coating can be adjusted such that a portion of the plasma and gas composition exiting the tail of the plasma can be in an overall reducing environment. The process flexibility in the introduction of varying gases of varying oxidizing and thermal characteristics allows such changes in gas composition as a function of plasma profile and exit gases to be made. For example, in the use of zinc oxide precursors, optionally with an interacting component such as an aluminum source, it has been found that the change from an oxidizing to a reducing environment enhances overall conductivity of the zinc oxide film on the substrate. Further, the use of carbon dioxide such as in low oxygen containing gases from partial combustion of hydrocarbon can be used advantageously to promote the formation of a multiple oxidation and reduction zone within the reaction zones and/or a reduction zone following the exit of the plasma gas from the reaction zone. Further, it is possible to add auxiliary gases such as reducing gases into the plasma at different introduction points within the plasma.

As set forth above, it is preferred that water in vapor form be part of one of the gases used in the plasma reaction zone. It has been found that the water along with oxygen enhances the overall conversion of metal oxide precursor to metal oxide coating particularly the formation of the crystalline networks, which optimize the conductivity of the metal oxide coating. The water typically is present in the reaction mixture liquid slurries and/or is added as part of the central and/or sheath gases used in the formation of a stable plasma. The advantage of the presence of water vapor is the enhancement in the formation of the plasma as well as in enhancing the overall reactivity and oxidation of the metal oxide precursor to metal oxide coating.

The metal oxide coated substrates exit the reaction zone and are rapidly quenched to lower temperatures including temperatures wherein relatively moderate to low or even no significant oxidation is taking place of the metal oxide precursor. The metal oxide coated substrates are recovered by conventional means such as typical powder particle collection means. As set forth above, the metal oxide coated substrates can be further processed such as by sintering and/or calcinations and/or annealing to further oxidize and/or densify the metal oxide coatings and/or more fully develop the optimum crystal structure for enhancing overall conductivity and/or magnetic properties of the final coated substrate.

As set forth above, the thermal source can be obtained from combustion such as a flame produced by the combustion of a flammable gas such as actylene, propane or low molecular weight hydrocarbons, such as kerosene. The thermal and kinetic energy associated with the flame combustion process can be varied to provide elevated temperatures and residence times and/or particle substrate velocity within the ranges as set forth above. The combustion flame process provides a reaction zone wherein the gas composition within the reaction zone can be varied according to the gas combustion characteristics used to provide the reaction zone. Further, the composition of the gas can be varied according to the type of flammable gas used in the combustion process and the ratio of oxygen to inert gas that is used as the oxidant. Thus the ratio of residual oxygen, carbon dioxide and water vapor can be adjusted by varying the stochiometry of the reactants and the type of fuel source. Further, auxiliary gases can be added such as water vapor to moderate and modify the combustion flame characteristics. In addition, such auxiliary gases including inert gases can be added directly into the combustion flame or as a sheath, i.e. curtain or shroud, surrounding the combustion flame. Further, the reactant mixture can be introduced directly into the combustion flame or as in the case of the RF induction plasma at varying angles to the flame or on the outer or adjacent surface or tail of the flame. The temperature profiles within the combustion flame are typically lower than the temperatures that can be achieved in the RF induction plasma typically in the range of from about 750° K. to about 1,500° K. The unexpected process improvement for producing metal oxide coated substrates with the combustion flame is the formation of a reaction zone at temperatures and residence times which allow for oxidation of the metal oxide precursor on the substrate. The various embodiments set forth above with respect to reaction mixture introduction into the reaction zone, preference for atomization of the reaction mixtures, variations on introduction of the reaction mixtures at various locations within the reaction zone or at the tail end of the reaction zone, variations in gas composition such as oxidizing and reducing zones are applicable to the flame combustion process.

The thickness of the metal oxide-containing coating can vary over a wide range and optimized for a given application and is generally in the range of from about 0.01 to about 0.75 microns or even from about 0.03 to about 0.5 microns, more preferably from about 0.05 micron to about 0.25 microns, still more preferably from about 0.07 micron to about 0.2 microns.

The reactant mixture may also include one or more other materials, e.g., dopants, catalysts, grain growth inhibitors, binders, solvents, etc., which do not substantially adversely affect the properties of the final product, such as by leaving a detrimental residue or contaminant in the final product after formation of the metal oxide-containing coating. Thus, it has been found to be important, e.g., to obtaining a metal oxide coating with good structural, mechanical and/or electronic and/or magnetic properties, that undue deleterious contamination of the coating be avoided. Examples of useful other materials include organic components such as alcohols, i.e. methanol, ethanol, isopropanol and mixtures thereof, acetonitrile, ethyl acetate, dimethyl sulfoxide, propylene carbonate and mixtures thereof; certain inorganic salts and mixtures thereof. Certain of these other material may often be corsidered as a carrier, e.g., solvent, for the metal chloride and/or interacting component to be associated with the substrate to form the rectant mixture.

The metal oxide coatings are typically derived from transition metal precursors, which contain transition elements of atomic numbers 21–31, 39–49 and 71–81, inclusive and tin. Examples of such metals are tin, copper, zinc chromium, tungsten, titanium, molybdenum and indium. The preferred elements are tin, copper, zinc, iron, chromium, tungsten, titanium, molybdenum, indium and mixtures. The particularly preferred metal elements are tin, zinc, iron, chromium, titanium and mixtures thereof.

As set forth above the metal oxide precursor is preferably selected from the group consisting of one or more metal chlorides, organic complexes, organic salts and oxidizable metal oxides such as stannous oxide. For powder reactant mixture it is preferred that metal chlorides, organic complexes and salts do not adversely oxidize and/or hydrolyze under the conditions of contacting the substrate with the metal oxide precursor to form the reactant mixture prior to oxidation to metal oxide in the reaction zone. Particularly preferred precursors are metal chlorides and lower valence oxidizable oxides and organic complexes, particularly di-ketone type complexes, i.e., acetylacetonate complexes.

Typical examples of metal chloride precursors are stannous chloride, stannic chloride, cuprous chloride, zinc chloride, ferric chloride, tungsten pentachloride, tungsten hexa chloride, molybdenum pentachloride, indium dichloride, indium monochloride, chromium$^2$ chloride and titanium tetrachloride. Preferred metal complexes are polyfunctional ketone complexes wherein such polyketone functionality is capable of complexing with the metal. For example, acetylacetonate complexes, i.e., complexes of zinc, chromium and the like.

As set forth above, it has been found that the substrate can be contacted with a metal oxide precursor powder to form the reactant mixture. The metal oxide precursor powder can be applied to the substrate as a powder, particularly in the range of from about 1 to about 10 microns in average particle size, the size in part being a function of the substrate particle size, i.e. smaller substrate particles generally require even smaller size powders. The powder is preferably applied dry to a dry substrate and as a charged fluidized powder, in particular having a charge opposite that of the substrate or at a temperature where the powder contacts and adheres to the substrate. In carrying out the powder coating, a coating system can be, for example, one or more electrostatic fluidized beds, spray systems having a fluidized chamber, and other means for applying powder, preferably in a film forming amount. The amount of powder used is generally based on the thickness of the desired metal oxide coating and incidental losses that may occur during processing. The powder process together with conversion to a metal oxide-containing coating can be repeated to achieve desired coating properties, such as desired gradient conductivities.

Typically, the fluidizing gaseous medium is selected to be compatible with the metal oxide precursor powder, i.e., to not substantially adversely affect the formation of a metal oxide coating on the substrate during conversion to a metal oxide-containing film.

Generally, gases such as air, nitrogen, argon, helium and the like, can be used, with air being a gas of choice, where no substantial adverse prehydrolysis or oxidation reaction of the powder precursor takes place prior to the oxidation-reaction to the metal oxide coating. The gas flow rate is typically selected to obtain fluidization and charge transfer to the powder. Fine powders require less gas flow for equivalent deposition. It has been found that small amounts of water vapor enhance charge transfer. The temperature for contacting the substrate with a powder precursor is generally in the range of about 0° C. to about 100° C. or higher, more preferably about 20° C. to about 40° C., and still more preferably about ambient temperature. The substrate however, can be at temperatures the same as, higher or substantially higher than the powder.

The time for contacting the substrate with precursor powder is generally a function of the substrate bulk density, thickness, powder size and gas flow rate. The particular coating means is selected in part according to the above criteria, particularly the geometry of the substrate. For example, particles, spheres, flakes, short fibers and other similar substrate, can be coated directly in a fluidized bed themselves with such substrates being in a fluidized motion or state. Typical contacting time can vary from seconds to minutes, preferably in the range of about 1 second to about 120 seconds, more preferably about 2 seconds to about 30 seconds.

Typical metal oxide precursor powders are those that are powders at powder/substrate contacting conditions and can be liquidous or solid at the fast reaction process conditions at the elevated temperatures in the reaction zone. It is preferred that the powder at least partially melts and substantially wets the surface of the substrate, preferably having a low contact angle formed by the liquid precursor in contact with the substrate and has a relatively low vapor pressure at the fast reaction and temperature conditions of oxidation, preferably melting within the range of about 100° C. to about 650° C. or higher. For tin oxide precursor powder it is preferred that melting is within the range of from about 100° to about 450°, more preferably about 250° C. to about 400° C. As set forth above, the fast reaction process conditions allow for the metal oxide precursor to rapidly react to a highly viscous and/or intermediate solid prior to substantial oxidation to the metal oxide coating. The process conditions allow for the association of this intermediate metal oxide and/or interactant component form and reduces the volatilization and/or oxidation of the metal oxide precursor off of the substrate. Typical powder metal oxide precursors are stannous chloride, stannous oxide, low molecular weight organic salts or complexes of tin, particularly low molecular weight organic salts and complexes such as stannous acetate and acetylacetonate complexes of tin.

An additional component powder, such as a dopant-forming powder, can be combined with the metal oxide precursor powder. A particularly preferred dopant-forming powder for tin oxide is stannous fluoride. Further, an additional component, such as a dopant, for example a fluoride, phosphorous, indium, or antimony component for tin oxide coatings can be incorporated during any of the reactant mixture forming steps.

Typical zinc oxide precursor powders are those that are powders at powder/substrate contacting conditions and which are preferably at least part liquidous at the fast reaction oxidizing conditions in the reaction zone, preferably melting within the range of about 100° C. to about 450° C., or higher, more preferably about 250° C. to about 400° C. Typical powder zinc oxide precursors are zinc chloride, low molecular weight organic salts or complexes of zinc, particularly low molecular weight organic salts and complexes such as zinc acetate and acetylacetonate complexes of zinc.

An additional component powder, such as a dopant-forming powder, can be combined with the zinc oxide precursor powder. Particularly preferred dopant-forming powders are aluminum and chromium acetylacetonate, benzylate and methyl substituted benzylate, cobalt II chloride, gallium dichloride, indium mono and dichloride, stannous chloride and germanium monoxide. Further, the above dopants or an additional component, for example a chloride or nitrate component of aluminum or titanium, can be used.

Typical copper oxide precursor powders are those that are powders at powder/substrate contacting conditions and which are at least part liquidous at the fast reaction oxidizing conditions in the reaction zone, preferably melting within the range of about 100° C. to about 650° C., more preferably about 435° C. to about 630° C. Typical powder copper oxide precursors are cuprous chloride, cuprous oxide low molecular weight organic salts or complexes of copper, particularly low molecular weight organic salts and complexes including poly functional/carboxyl, hydroxyl and ketone such as cuprous acetate and acetylacetonate complexes of copper.

An additional component powder, such as the conductivity forming additional powders, can be combined with the copper oxide precursor powder. The particularly preferred additional powders are yttrium chloride and/or oxide, barium carbonate and/or oxide or peroxide.

As set forth above, the copper oxide precursor powders and additional component conductivity interacting component can produce a film forming amount precursor component on the substrate, particularly distribution of the film over a substantial part of said substrate, followed by oxidation. In addition to the precursor components set forth above, nitrates, sulfates and their hydrates, as well as the hydrates of for example chloride, can be selected and used within the processing requirements for producing such conductive coated substrate.

Typical iron oxide precursor powders are those that are powders at powder/substrate contacting conditions in the reaction zone and which are at least part liquidous at the fast reaction oxidizing conditions of the present process, preferably melting within the range of about 300° C. to about 450° C., or higher, more preferably about 350° C. to about 300° C. As set forth above, the fast reaction process conditions allow for the metal oxide precursor to rapidly react to a highly viscous and/or intermediate solid prior to substantial oxidation to the metal oxide coating. The process conditions allow for the association of this intermediate metal oxide and/or interactant component for which reduces the volatilization and/or oxidation of the metal oxide precursor off of the substrate. Typical powder iron oxide precursors are ferric chloride, low molecular weight complexes of iron, such as poly functionality and complexes with carboxylic, ketone and hydroxyl functionality, such as acetylacetonate complexes of iron.

An additional component powder, such as a dopant-forming powder, can be combined with the iron oxide precursor powder. Particularly preferred interacting-forming powders are compounds of nickel, zinc, manganese, yttrium, the rare earths, barium, calcium and silica. Further, an additional component, such as an interacting component, for example a chloride hydrate and/or nitrate hydrate and/or a di-ketone complex can be incorporated into the reactant mixture, for example, zinc acetylacetonate as a source of the metal interacting compound.

As set forth above, the metal oxide precursor, optionally including the interacting component can be associated with the substrate as liquid slurry. For example, a liquid soluble metal chloride and/or interacting component, i.e. chloride or fluoride salt or a suspension and/or precipitated suspension, may be used. The use of liquid metal oxide precursor and/or interacting component provides advantageous substrate association particularly efficient and uniform association with the substrate. In addition, coating material losses are reduced.

The metal oxide precursors and interacting components set forth above with respect to powders in general can be used also to make the liquid slurries. The preferred interacting components as set forth above with respect to powders are also preferred for the liquid slurries. In addition, liquids, low melting and liquid soluble metal salts can be used advantageously for the liquid slurries.

As set forth above, it is preferred that the reaction mixture liquid slurries maximize the concentration of the substrate consistent with slurry, viscosity atomization requirement in the reaction zone. The amount of metal oxide precursor and optionally interacting component which are incorporated into the slurry is generally a function of the thickness of the metal oxide coating on the substrate for the final product. For example, a metal oxide coating of 50 nanometers will require less than a 250 nanometer metal oxide coating. Further, the surface area of the substrate, typically a function of particle size per unit weight will effect the concentration of the metal oxide precursor and interactant. The reactant slurries contain a solvent which allows for the solubilization and/or precipitation of one or both of the metal oxide precursor and interactant. The preferred solvents are aqueous solvent systems containing an alcohol such as a lower molecular weight alcohol, i.e. methanol, ethanol or isopropanol and mixtures thereof, which allow for solubilization of both the metal oxide precursor and interactant. For example, a preferred liquid slurry which contains soluble oxide precursor and interacting component are stannous and stannic chlorides and a interacting component such as antimony trichloride or ammonium fluoride or bifluoride. The liquid slurries in addition can have a pH less than 7 which enhances overall solubility such as through the use of hydrochloric acid.

The precipitated liquid slurry reaction mixtures can be made by forming a first soluble solution of an appropriate metal oxide precursor such as metal chloride salts in an alcohol solution or an acidic solution such as hydrochloric acid acidic solutions and adding such solutions slowly at elevated temperature such as from about 50° to 90° C. to an aqueous suspension of the substrate. The gradual addition of the oxide precursor interactant solution generally in the presence of hydroxyl ion provides for a slow and gradual hydrolysis and precipitation of the salts generally as an hydroxide, preferably on the surfaces of the substrate in a uniform layer. The precipitant slurry reactant mixture is introduced into the reaction zone for conversion to the metal oxide coated substrate. One of the significant advantages of the process of this invention using precipitant slurry reaction mixtures is that the slurry itself can be directly fed into the reaction zone without requiring separation of the precipitant plus substrate, washing of the substrate and calcinations of sintering of the precipitant associated substrate. The prior art processes typically require extensive processing times in the order of many hours. The precipitant slurry reaction mixture and the precipitant process are typically undertaken at high substrate liquid slurry concentrations without the introduction of deleterious contaminants. Thus it is preferred to use solvent systems which do not contribute deleterious contaminants to the metal oxide coating. If a source of hydroxyl ion is used to enhance the precipitation process it is preferred to use a source such as ammonium hydroxide or calcium hydroxide which do not substantially interfere with the final properties of the metal oxide film. Further, in the case of precipitant reaction mixtures, the precipitant substrates can be filtered, washed of extraneous ions, such as sodium or chloride, and reslurried for use as a reaction mixture. In order to control the viscosity of the liquid slurries, particularly at high substrate concentration a dispersant or deflocculant can be added to reduce and/or minimize any substrate agglomeration.

The oxide precursor and/or interacting component to be contacted with the substrate may be present in an atomized state. As used in this context, the term "atomized state" refers to both a substantially gaseous state and a state in which the oxide precursor and/or interacting component are present as drops or droplets and/or solid dispersion such as colloidal dispersion in for example a carrier gas, i.e., an atomized state. Liquid state oxide precursor and/or interacting component may be utilized to generate such reaction mixture.

In addition to the other materials, as noted above, the reactant mixture may also include one or more grain growth inhibitor components. Such inhibitor component or components are present in an amount effective to inhibit grain growth in the metal oxide-containing coating. Reducing grain growth leads to beneficial coating properties, e.g., higher electrical conductivity, more uniform morphology, and/or greater overall stability. Among useful grain growth inhibitor components are components which include at least one metal ion, in particular potassium, calcium, magnesium, silicon, zinc and mixtures thereof. These components are typically used at a concentration in the final coating of from about 0.01 to 1.0 wt % basis coating. Of course, such grain growth inhibitor components should have no substantial detrimental effect on the final product.

The interacting component may be deposited on the substrate separately from the oxide precursor, for example, before and/or during the oxide precursor/substrate contacting. If the interacting component is deposited on the substrate separately from the oxide precursor it should be deposited after the oxide precursor but before oxidation to the oxide film, such as to form soluble and/or eutectic mixtures and/or dispersions.

Any suitable interacting component may be employed in the present process. Such interacting component should provide sufficient interacting component so that the final metal oxide coating has the desired properties, e.g., electronic conductivity, stability, magnetic properties, etc. Care should be exercised in choosing the interacting component or components for use. For example, the interacting component should be sufficiently compatible with, for example, the oxide precursor so that the desired metal oxide coating can be formed. Interacting components which are excessively volatile (relative to oxide precursor), at the conditions employed in the present process, are not preferred since, for example, the final coating may not be sufficiently developed with the desired properties and/or a relatively large amount of the interacting component or components may be lost during processing. It may be useful to include one or more property altering components, e.g., boiling point depressants, in the composition containing the dopant-forming component to be contacted with the substrate. Such property altering component or components are included in an amount effective to alter one or more properties, e.g., boiling point, of the interacting component, e.g., to improve the compatibility or reduce the incompatibility between the interacting component and oxide precursor.

Particularly useful dopants for use in the tin oxide products and process of this invention are anion and cation dopants, particularly fluoride components selected from stannous fluoride, stannic fluoride, ammonium fluoride, ammonium bifluoride and mixtures thereof, antimony, indium and phosphorous, i.e. orthophosphoric acid, diammonium orthophosphate. The preferred dopants are those that provide for optimum dopant incorporation while minimizing dopant precursor losses, particularly under the preferred process conditions as set forth herein. In addition oxides or sub-oxides can also be used, including where dopant incorporation is accomplished during the oxidation sintering contacting step.

The use of a fluoride dopant is an important feature of certain aspects of the present invention. First, it has been found that fluoride dopants can be effectively and efficiently incorporated into the tin oxide-containing coating. In addition, such fluoride dopants act to provide tin oxide containing coatings with good electronic properties referred to above, morphology and stability.

Particularly useful dopant components for use in the zinc oxide products and process of the present invention are selected from aluminum, cobalt, gallium, titanium, indium, tin and germanium, particularly oxide forming dopant components, as well as zinc metal forming compounds and/or the use of such process condition which form dopant concentrations of zinc metal. Preferred dopant oxide precursors are set for above and include the halide, preferably the chlorides, organic complexes, such as low molecular weight organic acid salts, complexes, such as low molecular weight, ketone components, preferably 2, 4, dienes, benzylates and the like. The preferred dopants are those that provide for optimum dopant oxide incorporation while minimizing dopant precursor losses, particularly under the preferred process condition as set forth herein. Oxides or suboxides can also be used where dopant incorporation is accomplished during the oxidation sintering contacting step.

The use of a dopant is an important feature of certain aspects of the present invention. First, it has been found that such dopants, particularly aluminum can be effectively and efficiently incorporated into the zinc oxide-containing coating. In addition, such dopants act to provide zinc oxide-containing coatings with good electronic properties referred to above, morphology and stability.

As set forth above, the reaction zone gas phase constituents can be adjusted to provide a reducing environment after the oxidation conditions within the reaction zone. Further, the reducing conditions can be at the tail end of the zone prior to the metal oxide coated particle substrates undergoing reaction quench and significantly lower temperatures. The use of the combination of controlled oxidation and reduction zones within the reaction zone and tail portion of the reaction zone can be particularly beneficial for creating defect structure with or without an interacting component for conductive zinc oxide coated substrates.

Any suitable conductivity compatible and/or enhancing component may be employed in the copper oxide product and processes of this invention. Such conductivity interacting component should provide sufficient stoichiometry so that the final copper oxide coating has the desired properties, e.g., electronic conductivity, stability, etc. Chloride, nitrate, sulfate, organic complexes as set forth above and their hydrate components are particularly useful additional components with oxide, peroxide and carbonates being also useful. Care should be exercised in choosing the additional component or components for use. For example, the components should be sufficiently compatible with oxide precursor such as cuprous chloride so that the desired conductive copper oxide coating can be formed.

The use of an additional component is an important feature of certain aspects of the present invention. First, it has been found that such components can be effectively and efficiently incorporated into the copper oxide-containing coating. In addition, such additional components act to provide copper oxide-containing coatings with excellent electronic properties referred to above, morphology and stability.

Any suitable interacting-forming component may be employed in the iron oxide products and processes of this invention. Such interactant forming component should provide a sufficient concentration so that the final iron oxide coating has the desired properties, e.g., magnetic, high permeability, stability, for example, nickel, manganese or zinc components. Preferred iron component oxide precursors are set for above and include the halide, preferably the chlorides, organic complexes, such as low molecular poly functional organic acids, complexes, such as low molecular weight, ketone components, preferably 2, 4, ketones, benzylates and the like. The preferred interacting components are those that provide for optimum oxide incorporation while minimizing dopant precursor losses, particularly under the preferred process condition as set forth herein. Oxides or suboxides can also be used where dopant incorporation is accomplished during the oxidation sintering contacting step.

The use of an interactant component is an important feature of certain aspects of the present invention. First, it has been found that interactant components can be effectively and efficiently incorporated into the iron oxide-containing coating. In addition, such interactant components act to provide iron oxide-containing coatings with good magnetic properties referred to above, morphology and stability.

The liquid compositions, which include oxide precursor preferably also include the interactant component. In this embodiment, the interactant component or components are preferably soluble and/or dispersed homogeneously and/or atomizeable as part of the reactant mixture. Such mixtures are particularly effective since the amount of interactant component in the final metal oxide coating can be controlled by controlling the concentration in the reactant mixture. In addition, both the oxide precursor and interactant component are associated with the substrate in one step.

If stannous fluoride and/or stannic fluoride are used in tin oxide coatings, such fluorine components provide the dopant and are converted to tin oxide during the oxidizing agent/reaction mixture contacting step. This enhances the overall utilization of the coating components in the present process. Particularly useful compositions comprise about 50% to about 98%, more preferably about 70% to about 95%, by weight of stannous chloride and about 2% to about 50%, more preferably about 5% to about 30%, by weight of fluoride component, in particular stannous fluoride.

In addition, if zinc chlorides are used, such chloride components can provide the dopant and are converted to oxides during the oxidizing agent/reactant mixture contacting step. This enhances the overall utilization of the coating components in the present process. Particularly useful final zinc oxide compositions comprise about 0.1% to about 5%, more preferably about 0.5% to about 3%, by weight of dopant.

In addition, if cuprous chloride and yttrium chloride, and a barium oxide precursor (dispersed) are used, such components provide the conductivity stoichiometry and are converted to copper oxide during the oxidizing agent/reactant mixture contacting step. This enhances the overall utilization of the coating components in the present process. Particularly useful compositions produce a yttrium to barium to copper oxide ratio of 1,2,3 or 1,2,4.

A preferred class of superconductor coatings are the 1, 2, 3 and 1, 2, 4 superconductors of yttrium, barium and copper. In addition, thallium, barium, calcium and copper oxide in an atomic weight ratio of about 2, 2, 2, 3 are also preferred. Bismuth based copper oxide conductors are further examples of conductors within the scope of this invention. The coating prepared by the process of this invention enhance the current carrying capability of the conductors, can reduce grain boundary current carring effects or provide improved control of oxidation and/or annealing conditions and uniformity, including the requisite atomic weight stoichiometry.

In addition, if chlorides or organic precursors of iron are used, such precursor components are converted to oxides during the oxidizing agent/reaction mixture contacting step. This enhances the overall utilization of the coating components in the present process.

The substrate including the oxide precursor and optionally the interactant is contacted with an oxidizing agent at conditions effective to convert oxide precursor to metal oxide, and preferably to form a conductive and/or ferro magnetic tin oxide and/or other coating on at least a portion of the substrate. Water, e.g., in the form of a controlled amount of humidity, is preferably present during the oxidizing agent contacting. This is in contrast with certain prior metal oxide coating methods which are conducted under anhydrous conditions. The presence of water during this contacting has been found to provide an oxide coating having excellent electrical properties particularly conductivity.

Any suitable oxidizing agent may be employed, provided that such agent functions as described herein. Preferably, the oxidizing agent (or mixtures of such agents) is substantially gaseous at the reactant mixture/oxidizing agent contacting conditions. The oxidizing agent preferably includes reducible oxygen, i.e., oxygen which is reduced in oxidation state as a result of the coated substrate/oxidizing agent contacting. More preferably, the oxidizing agent comprises molecular oxygen, singlet oxygen either alone or as a component of a gaseous mixture, e.g., air. As set forth above, it is preferred that water vapor be present in the reaction zone with the oxidizing agent. It has been found that the presence of water vapor enhances the overall oxidation hydrolysis reactions in the reaction zone and in addition can provide for improved oxidation and crystalline metal oxide containing coatings on the particle substrates.

The substrate may be composed of at least a part of any suitable inorganic material and may be in any suitable form. By the term suitable inorganic substrate is meant that the majority of the external surface of the particle substrate be inorganic, more preferably greater than about 75% and still more preferably greater than about 95% of the surface being inorganic. The internal core of the particle substrates can be organic, preferably organic polymers having high temperature thermal stability under the fast reaction temperature conditions in the reaction zone. The polymers can be thermoplastics or thermosets, preferably high temperature thermoplastics such as polyimides, polyamide-imides, polyetherimides, bismalemides, fluoroplastics such as polytetrafluoroethylene, ketone-based resins, polyphenylene sulfide, polybenzimidazole, aromatic polyesters, and liquid crystal polymers. Most preferred are imidized aromatic polyimide polymers, para-oxybenzoylhomopolyester and poly(para-oxybenzoylmethyl) ester. In addition polyolefines, particularly crystalline high molecular weight types can be used. The inorganic organic substrates can be prepared by precoating the organic substrate with an inorganic precoat as set forth below.

Preferably, the substrate is such so as to minimize or substantially eliminate deleterious substrate, coating reactions and/or the migration of ions and other species, particularly p-dopant type cations such as alkalai metal ion, if any, from the substrate to the metal oxide-containing coating which are deleterious to the functioning or performance of the coated substrate in a particular application. However, controlled substrate reaction which provides the requisite stoichiometry can be used and such process is within the scope of this invention. In addition, the substrate can be precoated to minimize ion migration, for example an alumina and/or a silica including a silicate precoat and/or to improve wetability and uniform distribution of the coating materials on the substrate. The precoats can comprise one or more members of a group of alumina, zirconium oxide, silica and other oxides such as tin oxide. The precoats can be deposited on the substrates including inorganic and organic core substrates using any suitable technique such as hydrolysis and precipitation of a soluble salt. In addition, the precoat process can be repeated in order to obtain a precoat thickness to for example minimize deleterious effects from cations contained in the substrate and/or improve the thermal barrier properties of the precoat in relationship to an organic core.

The techniques for forming the precoat in general are similar to those set forth above for performing the precipitated liquid slurries and include precoat precursors to the final oxide precoat.

In addition to the above techniques for forming a precoat, the substrate particles, particularly the inorganic particles, can be processed in accordance with the process of this invention with a precoat forming material such as silicic acid or disilicic acid. In general, the precoat precursor would be combined with the substrate to form a precoat reaction mixture which is then subjected to process conditions in the reaction zone in order to obtain decomposition of the precursor precoat component on the substrate. It is contemplated within the scope of this invention that a multi stage process can be used, i.e. the first stage being a precoat of the substrate in the reaction zone using the various types of feeds similar to those set forth above which contain the metal oxide precursor and subjecting such feed to fast reaction elevated temperature conditions in a reaction zone to form the precoated substrate. The precoated substrate can be combined with the metal oxide precursor to be process and according to the process of this invention.

It has also been found that the substrate itself can be selectively melted at the surface to produce a precoat barrier layer, preferably a melt/resolidification coating, still more preferably a majority or even greater crystalline layer on the outer surface of the inorganic substrate. The selective melting of the surface of the inorganic substrate can provide both barrier properties as well as enhanced bondability of the metal oxide coating on the substrate, particularly with the formation of crystalline type surface coating as set forth above. The process for the selective melting of the surface of the inorganic substrate can be done in multiple process steps or in a single step in carrying out the process of this invention. For example, the selective melting of the external surface of the inorganic substrate can be done in a manner similar to the formation of a barrier coat as set forth above followed by incorporating the surface modified substrate along with the metal oxide precursor to form the reactant mixture. The reaction mixture is then processed according to the process of this invention. In addition the reactant mixture can be introduced into the reaction zone under conditions wherein the selective melting and resolidification of the surface of the inorganic substrate takes place, i.e. a single step process. It has been found that the inorganic substrate having a surface that has undergone selective melting, resolidification has unique properties when associated with the metal oxide coating. These improved properties can include enhanced barrier properties, bonding with the metal oxide coating and overall morphology stability.

In order to provide for controlled electrical conductivity in the conductive metal oxide coatings, it is preferred that the substrate be substantially non-electronically conductive and/or non-deleterious reactive and/or substantial non-magnetic when the coated substrate is to be used as a component/such as additive of an electric/electronic device, acoustic device and/or magnetic device. The substrate can be partially or completely inorganic, for example mineral, glass, ceramic and/or carbon. Examples of three dimensional substrates which can be coated using the present process include spheres, extrudates, flakes, fibers, aggregates, porous substrates, stars, irregularly shaped particles, tubes, such as having an average largest dimension of from about 0.05 microns to about 250 microns, more preferably from about 1 micron to about 75 microns.

A particularly unique embodiment of the present metal oxide coated particles is the ability to design a particular density for a substrate through the use of one or more open or closed cells, including micro and macro pores particularly, including cell voids in spheres which spheres are hereinafter referred to as hollow spheres. Thus such densities can be designed to be compatible and synergistic with other components used in a given application, particularly optimized for compatibility in liquid systems such as polymer film coating and composite compositions. The average particle density can vary over a wide range such as densities of from about 0.1 g/cc to about 2.00 g/cc, more preferably from about 0.13 g/cc to about 1.5 g/cc, and still more preferably from about 0.15 g/cc to about 0.80 g/cc.

A further unique embodiment of the present invention is the ability to selectively have a metal oxide on the outer surface area while limiting the metal oxide coating on the internal pore surface area of the substrate typically limiting the coating to at least about 10% noncoated internal pore surface area as a percentage of the total surface area of the substrate. Typically, the porous substrates will have a total surface area in the range of from about 0.01 to about 700 $m^2$/gram of substrate, more typically from about 1 to about 100 $m^2$/gram of substrate. Depending on the application such as for catalysts, the surface area may vary from about 10 to about 600 $m^2$/gram of substrate.

As set forth above, porous substrate particles can be in many forms and shapes, especially shapes which are not flat surfaces, i.e., non line-of-site materials such as pellets, fiber like, beads, including spheres, flakes, aggregates, and the like. The percent apparent porosity, i.e., the volume of open pores expressed as a percentage of the external volume can vary over a wide range and in general, can vary from about 20% to about 92%, more preferably, from about 40% to about 90%. A particularly unique porous substrate is diatomite, a sedimentary rock composed of skeletal remains of single cell aquatic plants called diatoms typically comprising a major amount of silica. Diatoms are unicellular plants of microscopic size. There are many varieties that live in both fresh water and salt water. The diatom extracts amorphous silica from the water building for itself what amounts to a strong shell with highly symmetrical perforations. Typically the cell walls exhibit lacework patterns of chambers and partitions, plates and apertures of great variety and complexity offering a wide selection of shapes. Since the total thickness of the cell wall is in the micron range, it results in an internal structure that is highly porous on a microscopic scale. Further, the actual solid portion of the substrate occupies only from about 10–30% of the apparent volume leaving a highly porous material for access to liquid. The mean pore size diameter can vary over a wide range and includes macroporosity of from about 0.075 microns to 10 microns with typical micron size ranges being from about 0.5 microns to 15 about 5 microns. As set forth above, the diatomite is generally amorphous and can develop crystalline character during calcination treatment of the diatomite. For purposes of this invention, diatomite as produced or after subject to treatment such as calcination are included within the term diatomite.

The particularly preferred macroporous particles for use in this invention are diatomites obtained from fresh water and which have fiber-like type geometry. By the term fiber-like type geometry is meant that the length of the diatomite is greater than the diameter of the diatomite and in view appears to be generally cylindrical and/or fiber-like. It has been found that these fiber-like fresh water diatomites provide improved properties in coatings and composite applications.

As set forth above, substrates can be inorganic for example, carbon including graphite and/or an inorganic oxide. Typical examples of inorganic oxides which are useful as substrates include for example, substrates containing one or more silicate, aluminosilicate, silica, sodium borosilicate, insoluble glass, soda lime glass, soda lime borosilicate glass, silica alumina, titanium dioxide, mica, as well other such glasses, ceramics and minerals which are modified with, for example, another oxide such as titanium dioxide and/or small amounts of iron oxide.

Additional examples of substrates are wollastonite, titanates, such as potassium hexa and octa titanate, carbonates and sulfates of calcium and barium; borates such as aluminum borate, a natural occurring quartz and various inorganic silicates, clays, pyrophyllite and other related silicates.

A particularly unique coated three-dimensional substrate is a flake and/or fiber particle, such as having an average largest dimension, i.e. length of from about 0.1 micron to about 200 microns more preferably from about 1 micron to about 100 microns, and still more preferably from about 5 microns to about 75 microns, particularly wherein the aspect ratio, i.e., the average particle length divided by the thickness of the particle is from about five to one to about 200 to 1, more preferably from about 25 to 1 to about 200 to 1 and still more preferably, from about 50 to 1 to about 200 to 1. Generally, the particles will have a thickness varying from about 0.1 microns to about 15 microns, more preferably from about 0.1 micron to about 10 microns. The average length, i.e., the average of the average length plus average width of the particle, i.e., flake, will generally be within the aspect ratios as set forth above for a given thickness. Thus for example the average length as defined above can from about 1 micron to about 300 microns, more typically from about 20 microns to about 150 microns. In general, the average length can vary according to the type of substrate and the method used to produce the platelet material. For example, C glass in general has an average length which can vary from about 20 microns up to about 300 microns, typical thicknesses of from about 1.5 to about 15 microns. Other particle materials for example, hydrous aluminum silicate mica, in general can vary in length from about 5 to about 100 microns at typical thicknesses or from about 0.1 to about 7.0 microns, preferably within the aspect ratios set forth above. In practice the particles which are preferred for use in such applications in general have an average length less than about 300 microns and an average thickness of from about 0.1 to about 15 microns. Ceramic fibers are particularly useful substrates when the copper oxide coated substrate is to be used as a superconductor.

A particular unique advance in new products resulting from the process of this invention are the production of metal oxide coated nano particle substrates typically having an average particle size less than 1,000 nanometers, typically less than 500 and still typically less than 100 nanometers. In many applications the average particle size will be less than about 50 nanometers. The particle size distribution of the nano particle substrates are skewed towards the smaller particle size and typically have greater than 90%, often greater than 95% of the total number particles on a weight basis, less than 1,000 nanometers, typically less than 500 nanometers, and still more typically less than 100 nanometers. It has been discovered that the use of liquid slurry reaction mixtures particularly metal oxide precursor and optionally interacting component which are soluble in the slurry liquid are able to produce metal oxide coated nanosubstrates which vary in thickness from about 5% to about 75%, more preferably from about 10% to about 60% of the average thickness on the smallest dimension of the substrate particle, such as the thickness in a flake or the diameter in a fiber. The various physical and chemical properties of the substrates and coatings as set forth above are applicable to nanosubstrates. The significant advantage of the soluble metal oxide precursor and/or interacting component is the ability to provide the concentration of these coating forming components that produce the desired coating thickness on the nanosubstrates.

A particular unique substrate is referred to as swelling clays or smectites. These types of clays have a layered structure where in each layer can be treated to expand the spacing between layers such as to provide individual layers of the clay of vary small thicknesses such as from about 1 to 2 nanometers. The aspect ratios are significant particularly if the largest length extends to 1,000 nanometers. The spacing between the different sheets are called the gallery which are expanded upon treatment particularly with polar materials to provide for increased spacing between each sheet.

These phyllosilicates, such as smectite clays, e.g., sodium montmorillonite and calcium montmorillonite, can be treated with polar molecules, such as ammonium ions, to intercalate the molecules between adjacent, planar silicate layers, for intercalation of precursor between the layers, thereby substantially increasing the interlayer (interlaminar) spacing between the adjacent silicate layers. The thustreated, intercalted phyllosilicates, having interlayer spacings of at least about 10–20. ANG. and up to about 100 ANG., then can be exfoliated, e.g., the silicate layers are separated, e.g., mechanically, by high shear mixing. The individual layers have been found to substantially improve one or more properties of polymer coatings and composites, such as mechanical strength and/or high temperature characteristics.

Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosiovite, ledikite and admixtures of illites with the clay minerals set forth above.

As set forth above the reaction mixture can be in a powder form with the metal oxide precursor present on the surface of the substrate as has been illustrated above. The powders can be associated with the surface of the substrate by attraction through opposite static charges. In addition a binder can be associated with the metal oxide precursor powder, which enhances the association of the precursor powder with the substrate. The binder can be inorganic or organic. As set forth above, the binder should not introduce any substantial deleterious contaminants into the metal oxide coating or substantially adversely affect the overall film properties such as conductive or magnetic properties. The binders can be for example polymeric type such as polyvinylalcohol or polyvinylpyrrolidone. In addition, the binder can have both organic and inorganic functionality such as an organic silicate such as an ethyl silicate. In addition, the inorganic binders can be used such as calcium silicate, boric oxide and certain carbonate, nitrates and oxalates. In the case of organic binders it is preferred to use such organic binders that will be converted to a carbon oxide such as carbon monoxide or carbon dioxide under the process conditions in the reaction zone without leaving any substantial deleterious carbon contaminant associated with the metal oxide coated substrate. In addition, the use of organic binders can provide for a reducing atmosphere in a transition from oxidizing conditions to reducing conditions in the reactor zone or the exit of the reactor zone. It is preferred to use a binderless powder substrate reaction mixture in order to eliminate potential contaminant effects. When a binder is used, the concentration of the binder is such as to maintain the individual particle substrate integrity or if agglomeration does occur, to be easily converted to nonagglomerated particles through low severity mechanical processing such as ball milling.

The coated particles are particularly useful in a number of applications, particularly lead acid batteries, including conductivity additives for positive active material, catalysts, heating elements, electrostatic dissipation elements, electromagnetic interference shielding elements, electrostatic bleed elements, protective coatings, field dependent fluids, laser marking and the like. In practice spherical particles for use in applications in general have a roundness associated with such particles, generally greater than about 70% still more apreferably, greater than about 85% and still more preferably, greater than about 95%. The spherical products offer particular advantages in many of such applications disclosed herein, including enhanced dispersion and rheology, particularly in various compositions such as polymer compositions, coating compositions, various other liquid and solid type compositions and systems for producing various products such as coatings and polymer composites.

The substrate for use in lead-acid batteries is acid resistant. That is, the substrate exhibits some resistance to corrosion, erosion and/or other forms of deterioration at the conditions present, e.g., at or near the positive plate, or positive side of the plates, in a lead-acid battery.

Ferrite is a generic term describing a class of magnetic oxide compounds that contain iron oxide as a major component. There are several crystal structure classes of compounds broadly defined as ferrites, such as spinel, magnetoplumbite, garnet, and perovskite structures.

Although there are many characterizations specific to a given application, one property is shared by all materials designed as ferrites, namely the existence of a spontaneous magnetization (a magnetic induction in the absence of an external magnetic field).

Any suitable matrix material or materials may be used in a composite with the metal oxide coated substrate. Preferably, the matrix material comprises a polymeric material, e.g., one or more synthetic polymers, more preferably an organic polymeric material. The polymeric material may be either a thermoplastic material or a thermoset material. Among the thermoplastics useful in the present invention are the polyolefins, such as polyethylene, polypropylene, polymethylpentene and mixtures thereof; and poly vinyl polymers, such as polystyrene, polyvinylidene difluoride, combinations of polyphenylene oxide and polystyrene, and mixtures thereof. Among the thermoset polymers useful in the present invention are epoxies, phenol-formaldehyde polymers, polyesters, polyvinyl esters, polyurethanes, melamine-formaldehyde polymers, and urea-formaldehyde polymers.

In yet another embodiment, a metal oxide coated substrate including transition and tin metal oxide, preferably electronically conductive metal oxide, and optionally at least one additional catalyst component can be used as catalysts in an amount effective to promote a chemical reaction. Preferably, the additional catalyst component is a metal and/or a component of a metal effective to promote the chemical reaction. A particularly useful class of chemical reactions are those involving chemical oxidation or reduction. For example, an especially useful and novel chemical reduction includes the chemical reduction of nitrogen oxides, to minimize air pollution, with a reducing gas such as carbon monoxide, hydrogen and mixtures thereof. A particularly useful chemical oxidation application is a combustion, particularly catalytic combustion, wherein the oxidizable compounds, i.e., carbon monoxide and hydrocarbons are combusted to carbon dioxide and water. For example, catalytic converters are used for the control of exhaust gases from internal combustion engines and are used to reduce carbon monoxide and hydrocarbons from such engines. Of course, other chemical reactions, e.g., oxidative coupling of methane to alkanes and alkenes, hydrocarbon reforming, dehydrogenation, such as alkylaromatics to olefins, olefins to dienes, alcohols to ketones hydrodecyclization, isomerization, ammoxidation, such as with olefins, aldol condensations using aldehydes and carboxylic acids and the like, may be promoted using the present catalysts.

Any suitable additional catalyst component (or sensing component) may be employed, provided that it functions as described herein. Among the useful metal catalytic components and metal sensing components are those selected from components of the tins, the rare earth metals, certain other catalytic components and mixtures thereof, in particular catalysts containing gold, silver, copper, vanadium, chromium, cobalt molybdenum, tungsten, zinc, indium, the platinum group metals, i.e., platinum, palladium and rhodium, iron, nickel, manganese, cesium, titanium, etc. Although metal containing compounds may be employed, it is preferred that the metal catalyst component (and/or metal sensing component) included with the metal oxide coated substrates comprise elemental metal and/or metal in one or more active oxidized forms, for example, $Cr_2O_3$, $Ag_2O$, etc.

The preferred substrate materials for catalysts include a wide variety of materials used to support catalytic species, particularly porous refractory inorganic oxides. These supports include, for example, alumina, silica, zirconia, magnesia, boria, phosphate, titania, ceria, thoria and the like, as well as multi-oxide type supports such as alumina-phosphorous oxide, silica alumina, zeolite modified inorganic oxides, e.g., silica alumina, and the like. As set forth above, support materials can be in many forms and shapes, especially porous shapes which are not flat surfaces. The catalyst materials can be used as is or further processed such as by sintering of powered catalyst materials into larger aggregates. The aggregates can incorporate other powders, for example, other oxides, to form the aggregates.

A particularly unique property of the ferro magnetic products of this invention is the ability to be able to separate and recover catalysts from solution and/or other non-magnetic or low permeability solids by magnetic separation. This is particularly advantageous in slurry catalysts, such as in liquid systems, such as hydrocarbon and/or aqueous and/or combination systems. This property allows separation including separation from other non-magnetic solids and separate catalyst regeneration if required.

In addition, the ability to vary coating thickness and substrate composition allows designing catalyst for a given density, a feature important in gravity separation processes.

The metal oxide coated/substrate of the present invention are useful in other applications as well. Among these other applications are included porous membranes, heating elements, electrostatic dissipation elements, electromagnetic interference shielding elements, protective coatings, field dependent fluids and the like.

In another embodiment, the porous membrane comprises a porous organic matrix material, e.g., a porous polymeric matrix material, and a metal oxide-containing material in contact with at least a portion of the porous organic matrix material. With the organic matrix material, the metal oxide-containing material may be present in the form of a porous inorganic substrate, having a metal oxide-containing coating, e.g., an electronically conductive and/or ferro magnetic metal oxide-containing coating, thereon.

In addition, an electrostatic dissipation/electromagnetic interference shielding element is provided which comprises a three dimensional substrate, e.g., an inorganic substrate, having an electrically conductive and/or ferromagnetic transition metal oxide-containing coating on at least a portion of all three dimensions thereof. The coated substrate is adapted and structured to provide at least one of the following: electrostatic dissipation and/or bleed and electromagnetic interference shielding.

A very useful application for the products of this invention is for static, for example, electrostatic, dissipation and shielding, particularly for polymeric parts, and more particularly as a means for effecting static dissipation including controlled static discharge and dissipation such as used in certain electro static painting processes and/or electric field absorption in parts, such as parts made of polymers and the like, as described herein. The present products can be incorporated directly into the polymer or a carrier such as a cured or uncured polymer based carrier or other liquid, as for example in the form of a liquid, paste, hot melt, film and the like. These product/carrier based materials can be directly applied to parts to be treated to improve overall performance effectiveness. A heating cycle is generally used to provide for product bonding to the parts. A particularly unexpected advantage is the improved mechanical properties, especially compared to metallic additives which may compromise mechanical properties. In addition, the products of this invention can be used in molding processes to allow for enhanced static dissipation and/or shielding properties of polymeric resins relative to an article or device or part without such product or products, and/or to have a preferential distribution of the product or products at the surface of the part for greater volume effectiveness within the part.

The particular form of the products, i.e., fibers, flakes, irregularly shaped and/or porous particles, or the like, is chosen based upon the particular requirements of the part and its application, with one or more of flakes, fibers and particles, including spheres, being preferred for polymeric parts. In general, it is preferred that the products of the invention have a largest dimension, for example, the length of fiber or particle or side of a flake, of less than about 300 microns, more preferably less than about 150 microns and still more preferably less than about 100 microns. It is preferred that the ratio of the longest dimension, for example, length, side or diameter, to the shortest dimension of the products of the present invention be in the range of about 500 to 1 to about 10 to 1, more preferably about 250 to 1 to about 25 to 1. The concentration of such product or products in the product/carrier and/or mix is preferably less than about 60 weight %, more preferably less than about 40 weight %, and still more preferably less than about 20 weight %. A particularly useful concentration is that which provides the desired performance while minimizing the concentration of product in the final article, device or part.

The products of this invention find particular advantage in static dissipation parts, for example, parts having a surface resistivity in the range of about $10^4$ ohms/square to about $10^{12}$ ohms/square. In addition, those parts generally requiring shielding to a surface resistivity in the range of about 1 ohm/square to about $10^5$ ohms/square and higher find a significant advantage for the above products due to their mechanical properties and overall improved polymer compatibility, for example, matrix bonding properties as compared to difficult to bond metal and carbon-based materials. A further advantage of the above products is their ability to provide static dissipation and/or shielding in adverse environments such as in corrosive water and/or electro galvanic environments. As noted above, the products have the ability to absorb as well as to reflect electro fields. The unique ability of the products to absorb allows parts to be designed which can minimize the amount of reflected electro fields that is given off by the part. This latter property is particularly important where the reflected fields can adversely affect performance of the part.

In addition to the above described applications, zinc oxide is particularly useful in applications which require a large electro mechanical coupling coefficient, such as transducers in surface acoustic wave devices and microwave delay lines and various other acoustic and piezo devices. Such properties also have applications in telephone equipment, strain gauges, acoustic optical devices, i.e., laser deflectors and Fourier transform devices.

The potential applications for superconducting materials include large-scale, passive application such as shields or waveguides, superconductors screen or reflect electromagnetic radiation and uses range from coatings on microwave cavities to shielding against electromagnetic pulses and bearings. Repulsive forces of superconductors excluding magnetic fields provide for noncontact bearings.

In addition, high-current, high-field, applications include magnetic imaging/scientific equipment, such as, Superconducting magnets for nuclear magnetic resonance and imaging spectrometers and particle accelerators; Magnetic separation, such as, magnets used for separation and purification of steel scrap, clays, ore streams, stack gases, and desulfurizing coal.

Magnetic levitation such as high-speed train systems; electromagnetic launch systems which can accelerate objects at high velocity. Possible uses include rapidly repeatable, i.e., earth satellite launching, aircraft catapults, and small guns for military uses.

Other magnet applications include powerful magnets in compact synchrotons for electronic thin-film lithography, crystal growth, magnetohydrodynamic energy conversion systems, and ship propulsion by superconducting motors or by electromagnetic fields. Other high current high field applications include electric power transmission, such as, transmission cables, carrying more current than conventional conductors without loss. Such conductors must be mechanically rugged and operate under high field and high current conditions; energy storage, such as, large superconducting magnetic coils buried in the ground that can store vast amounts of electrical energy, without power loss, in persistent, circulating currents; load leveling for utilities and as power sources for military systems such as pulsed lasers; generators and motors, such as, low-temperature system operating with liquid helium. Motors can be used in ship propulsion, railway engines, and helicopters.

In the area of electronics, applications include passive devices, such as, high-speed wire interconnects in electronic circuits, digital devises, such as, superconducting components, based on Josephson junctions, to be used as switches or in computer logic and memory. In addition, the potential for hybridized semiconductor/superconductor electronic devices may provide yet unknown applications and devices; sensors, such as, superconducting quantum interference devices, SQUIDs). made from Josephson junctions which are extremely sensitive detectors of electromagnetic signals. Low-temperature SQUIDs are used in biomedical, geophysical, and submarine or airplane detection, infrared and microwave sensors.

Other devices include analog-to-digital convertors, voltage standards, signal processors, microwave mixers, filters, and amplifiers.

The copper oxide coated substrate, such as the 1,2,3 and 1,2,4 copper oxide coated substrate, of the present invention may be, for example, a component itself or a component of a composite together with one or more matrix materials. The composites may be such that the matrix material or materials substantially totally encapsulate or surround the coated substrate, or a portion of the coated substrate may extend away from the matrix material or materials.

The iron oxide/substrate combinations, including $Fe_3O_4$, e.g., the iron oxide coated substrates, of the present invention are useful in other applications as well.

The applications for the spinel ferrites can be grouped into several main categories: main cores, and linear, power, and recording-head applications.

Magnetic-core memories are based on switching small turoidal cores of spinel ferrite between two stable magnetic states. Such core memories are used in applications where ruggedness and reliability are necessary, e.g., military applications.

The linear or low signal applications are those in which the magnetic field in the ferrite is well below the saturation level and the relative magnetic permeability can be considered constant over the operating conditions.

The manganese-zinc-ferrite materials characteristically have higher relative permeabilities, higher saturation magnetization, lower losses, and lower resistivities. Since the ferromagnetic resonance frequency is directly related to the permeability the usual area of application is below 2 MHz.

At low signal levels, ferrite cores are used as transformers, low frequency and pulse transformers, or low energy inductors. As inductors, the manganese-zinc-ferrites find numerous applications in the design of telecommunications equipments where they must provide a specific inductance over specific frequency and temperature ranges. Nickel-zinc-ferrites with lower saturation magnetization, generally lower relative magnetic permeabilities, and lower resistivities ($10^6$.cm), produce ferromagnetic resonance effects at much higher frequencies than the manganese-zinc-ferrites. They find particular application at frequencies from 1 to 70 MHz (46).

By adjustment of the nickel-zinc ratio it is possible to prepare a series of materials covering the relative permeability range of 10–2000. These rods, high frequency power transformers, and pulse transformers. A variety of materials have been developed to serve these applications.

The lower magnetic losses of ferrite materials and its higher resistance (10 ohm.cm) compared with laminated transformer steel permits ferrite cores to be used as the transformer element in high frequency power supplies. Commonly known as switched-mode power supplies, they operate at a frequency of 15–30 kHz and offer higher efficiencies and smaller size than comparable laminated steel transformers.

Television and audio applications include yoke rings for the deflection coils for television picture tubes, flyback transformers, and various convergence and pincushion intortion corrections, as well as antenna rods.

Manganese-zinc and nickel-zinc-spinel ferrites are used in magnetic recording heads for duplicating magnetic tapes and the recording of digital information. Most recording heads are fabricated from polycrystalline nickel-zinc-ferrite for operating frequencies of 100 kHz to 2.5 GHz.

The unique properties of hexagonal ferrites are low density, and high coercive force.

The ceramic magnet can be used in d-c permanent magnet motors, especially in automotive applications, such window life, flower, and windshield-wiper motors.

Other grades of barium and strontium ferrite material have been developed for similar applications.

Other applications of hexagonal ferrites are used in self-resonant isolators where the strong magnetocrystalline anisotropy permits a resonator without laded-c magnetic biasing fields.

Hexagonal ferrites are also used as magnetic biasing components in magnetic bubble memories.

EXAMPLE 1

A liquid slurry reaction mixture is formed from a silica platelet having an average particle size of about 50 microns, stannic chloride, antimony trichloride (15 mole %), water and methanol. The substrate is at a concentration of about 45 wt % basis the total weight of the reaction mixture. The tin and antimony chloride are soluble in the reaction mixture.

The reaction mixture is fed into a reaction zone at elevated temperature. The elevated temperature is maintained by an RF induction plasma system operating at a power of about 30 kW at a frequency of 3 MHz. The central swirl gas is argon and the sheath gas, a mixture of argon and oxygen. The carrier gas is air. The reaction mixture is introduced into the reaction zone at a flow rate of 7.5 grams per minute. The gas velocities in the reaction zone are controlled to allow for an average particle residence time of about 15 milliseconds. The temperature within the reaction zone is controlled to allow for the structural solid maintenance of the substrate. The introduction of the reaction mixture is assisted by the air atomization of the reaction mixture. Tin oxide, antimony doped coated silica substrates are recovered in a collection zone. The collection zone uses a fabric bag filter to remove and recover the metal oxide coated substrates.

EXAMPLE 2

Example 1 is repeated except that the alcohol is removed from the reaction mixture and hydroxide ion is slowly added to the solution to provide for precipitation of tin and antimony metal salts on the substrate. A tin oxide coated silica substrate is recovered in the collection chamber.

EXAMPLE 3

Example 1 is repeated except that a flame combustion thermal source is used in place of the RF induction plasma system. In place of the central, sheath and carrier gases, a combustion gas having approximately 4 mole % oxygen was generated using air, propane and added water vapor. The average particle substrate residence time in the reaction zone was ten milliseconds. A tin oxide coated silica substrate is recovered.

EXAMPLE 4

Example 1 is repeated except that the reaction mixture is a free flowing powder obtained from contacting the silica platelet substrate with an anhydrous stannous chloride and stannous fluoride (25 mole %) having an average particle size of 5 microns. The central gas is argon enriched with water vapor, the sheath gas is air argon and the carrier gas is air. The reaction mixture is introduced at a rate of about 6 grams per minute. The average velocity of the particle substrate is 5 meters per second. A tin dioxide (antimony doped) silica platelet is recovered.

EXAMPLE 5

Example 4 is repeated except that water vapor is introduced into the sheath gas to promote formation of the crystalline doped tin dioxide coating.

EXAMPLE 6

Example 4 is repeated except the tin and antimony chlorides are replaced by zinc chloride and aluminum nitrate. Further the amount of oxygen in the carrier gas is reduced to a slight excess over that required for oxidation to zinc oxide and hydrogen is introduced into the sheath gas to promote the formation of a reducing atmosphere in the latter portion of the reaction zone. A zinc oxide aluminum doped coating on the silica substrate is recovered in the collection zone.

EXAMPLE 7

Example 1 is repeated except that the substrate is mica which is precoated with a silica precursor to form a barrier coat. The average particle size of the mica is 20 microns. Antimony doped tin oxide coated mica is recovered in the collection zone.

EXAMPLE 8

Example 7 is repeated except the mica is replaced with a polyimide powder having an average particle size of 40 microns. The silica precursor is tetraethoxysilicate. An antimony doped tin oxide coated silica on polyimide substrate is recovered.

EXAMPLES 9 AND 10

Examples 1 and 2 are repeated except that the tin and antimony chlorides are replaced by titanium tetrachloride. A titanium dioxide coated silica substrate having pearlescent properties is recovered in the collection zone.

EXAMPLES 11 AND 12

Examples 1 and 2 are repeated except the average particle substrate residence time is increased to 30 milliseconds. An antimony doped tin dioxide having uniform crystalline coating on the silica substrate is recovered in the collection zone.

EXAMPLES 13 AND 14

Examples 1 and 2 are repeated except that the average particle residence time is defined by particle velocity and is about 3 meters per second. An antimony doped tin dioxide coated silica substrate is recovered in the collection zone.

While this invention has been described with respect to various specific examples and embodiments, it is to be understood that the invention is not limited thereto and that it can be variously practiced within the scope of the following claims.

What is claimed is:

1. A process for producing a plurality of metal oxide coated three dimensional particle substrates comprising: forming a liquid slurry reactant mixture by contacting said particle substrates which include external surfaces and shielded surfaces which are at least partially shielded by other portions of said substrate with a composition comprising a reactant mixture soluble metal oxide forming compound, contacting said mixture at fast reaction oxidizing and elevated temperature conditions in a reaction zone in the presence of an oxidizing agent effective to form a metal oxide coating on at least a portion of the surfaces of said three dimensional substrate including at least a portion of the shielded surfaces of said particles at said conditions and without substantially adversely effecting the solid integrity of the substrate; said fast reaction oxidizing conditions in said zone including an average particle residence time of less than about one second when at fast reaction oxidizing elevated temperature conditions, which temperature is maintained by a thermal source which does not substantially adversely contribute deleterious contaminants to the metal oxide coating and recovering a plurality of metal oxide coated three dimensional particle substrates.

2. The process of claim 1 wherein the residence time is less than about 0.5 seconds and greater than about one millisecond.

3. The process of claim 2 wherein the residence time is less than about 0.25 seconds and greater than about one millisecond.

4. The process of claim 1 wherein the oxidizing agent is oxygen.

5. The process of claim 3 wherein the oxidizing agent is oxygen and the thermal source is a RF induction plasma.

6. The process of claim 4 wherein water is present with the oxidizing agent.

7. The process of claim 5 wherein water is present with the oxidizing agent.

8. The process of claim 1 wherein the recovered particles are substantially nonpermanently agglomerating particles.

9. The process of claim 1 wherein the metal is selected from the group consisting of tin, copper, zinc, iron, chromium, tungsten, indium, molybdenum, titanium, zirconium, and mixtures thereof.

10. The process of claim 6 wherein the metal is selected from the groups consisting of tin, zinc, iron, titanium and zirconium.

11. The process of claim 7 wherein the metal is selected from the groups consisting of tin, zinc, iron, titanium and zirconium.

12. The process of claim 1 wherein the particle substrates are selected from the group consisting of glass, ceramic, mineral, and mixtures thereof.

13. The process of claim 6 wherein the particle substrates are selected from the group consisting of particle substrates which are predominant in silica, silicate, or titanium oxide.

14. The process of claim 7 wherein the particle substrates are selected from the group consisting of particle substrates which are predominant in silica, silicate, or titanium oxide.

15. A process for producing a plurality of metal oxide interactant coated three dimensional particle substrate comprising: forming a liquid slurry reactant mixture by contacting said particle substrate which includes external surfaces and shielded surfaces which are at least partially shielded by other portions of said substrate with a composition comprising a reactant mixture soluble metal oxide and interactant forming compound, contacting said mixture at fast reaction oxidizing and elevated temperature conditions in a reaction zone in the presence of an oxidizing agent effective to form a metal oxide interactant coating on at least a portion of the surfaces of said three dimensional substrate including at least a portion of the shielded surfaces of said particle substrate at said conditions and without substantially adversely effecting the solid integrity of the substrate; said fast reaction oxidizing conditions in said zone including an average particle residence time of less than about one second when at fast reaction oxidizing elevated temperature conditions, which temperature is maintained by a thermal source which does not substantially adversely contribute deleterious contaminants to the metal oxide coating and recovering a plurality of metal oxide interactant coated three dimensional particle substrates.

16. The process of claim 15 wherein the residence time is less than about 0.5 seconds and greater than about one millisecond.

17. The process of claim 16 wherein the residence time is less than about 0.25 seconds and greater than about one millisecond.

18. The process of claim 15 wherein the oxidizing agent is oxygen.

19. The process of claim 17 wherein the oxidizing agent is oxygen.

20. The process of claim 18 wherein water is present with the oxidizing agent.

21. The process of claim 19 wherein water is present with the oxidizing agent.

22. The process of claim 15 wherein the recovered particles are substantially nonpermanently agglomerating particles.

23. The process of claim 15 wherein the metal is selected from the group consisting of tin, copper, zinc, iron, chromium, tungsten, indium, molybdenum, titanium, zirconium, and mixtures thereof.

24. The process of claim 20 wherein the metal oxide and interactant are selected from the group consisting of tin metal and an interactant selected from the group consisting of fluoride, antimony, and phosphorous and zinc metal and aluminum interactant.

25. The process of claim 21 wherein the metal oxide and interactant are selected from the group consisting of tin metal and an interactant selected from the group consisting of fluoride, antimony, and phosphorous and zinc metal and aluminum interactant.

26. The process of claim 16 wherein the particle substrates are selected from the group consisting of glass, ceramic, mineral, and mixtures thereof.

27. The process of claim 20 wherein the particles are selected from the group consisting of particle substrates which are predominant in silica, silicate, or titanium oxide.

28. The process of claim 21 wherein the particles are selected from the group consisting of particle substrates which are predominant in silica, silicate, or titanium oxide.

29. A process for producing a plurality of metal oxide coated three dimensional particle substrates comprising: forming a liquid slurry reactant mixture by contacting said particle substrates which includes external surfaces and shielded surfaces which are at least partially shielded by other portions of said substrate with a composition comprising a reactant mixture soluble metal oxide forming compound, contacting said mixture at fast reaction oxidizing and elevated temperature conditions in a reaction zone in the presence of an oxidizing agent effective to form a metal oxide coating on at least a portion of the surfaces of said three dimensional substrate including at least a portion of the shielded surfaces of said substrate at said conditions and without substantially adversely effecting the solid integrity of the substrate; said fast reaction oxidizing conditions in said zone including an average particle velocity of from about three to about 30 meters per second when at fast reaction oxidizing elevated temperature conditions, which temperature is maintained by a thermal source which does not substantially adversely contribute deleterious contaminants to the metal oxide coating and recovering a plurality of metal oxide coated three dimensional particle substrates.

30. The process of claim 29 wherein the particle velocity is from about 3 to about 15 meters per second.

31. The process of claim 30 wherein the particle velocity is from about 3 to about 7 meters per second oxygen and the thermal source is a RF induction plasma.

32. The process of claim 29 wherein the oxidizing agent is oxygen.

33. The process of claim 31 wherein the oxidizing agent is oxygen.

* * * * *